US008285656B1

(12) United States Patent
Chang et al.

(10) Patent No.: US 8,285,656 B1
(45) Date of Patent: Oct. 9, 2012

(54) SYSTEMS AND METHODS FOR DATA VERIFICATION

(75) Inventors: Albert Chia-Shu Chang, Lake Forest, CA (US); Gregory Dean Jones, Irvine, CA (US); Carolyn Paige Soltes Matthies, Ladera Ranch, CA (US)

(73) Assignee: Consumerinfo.com, Inc., Irvine, CA (US)

( * ) Notice: Subject to any disclaimer, the term of this patent is extended or adjusted under 35 U.S.C. 154(b) by 1087 days.

(21) Appl. No.: 12/058,632

(22) Filed: Mar. 28, 2008

Related U.S. Application Data

(60) Provisional application No. 60/921,188, filed on Mar. 30, 2007.

(51) Int. Cl.
*G06N 5/00* (2006.01)
(52) U.S. Cl. .......................................... 706/15; 706/45
(58) Field of Classification Search .................... 706/15, 706/45
See application file for complete search history.

(56) References Cited

U.S. PATENT DOCUMENTS

| | | | |
|---|---|---|---|
| 5,590,038 A | 12/1996 | Pitroda | |
| 5,640,577 A | 6/1997 | Scharmer | |
| 5,659,731 A | 8/1997 | Gustafson | |
| 5,692,107 A | 11/1997 | Simoudis et al. | |
| 5,819,291 A | 10/1998 | Haimowitz et al. | |
| 5,822,751 A | 10/1998 | Gray et al. | |
| 5,844,218 A | 12/1998 | Kawan et al. | |
| 5,881,131 A | 3/1999 | Farris et al. | |
| 5,930,764 A | 7/1999 | Melchione et al. | |
| 5,956,693 A | 9/1999 | Geerlings | |
| 5,960,430 A | 9/1999 | Haimowitz et al. | |
| 5,990,038 A | 11/1999 | Suga et al. | |
| 6,038,551 A | 3/2000 | Barlow et al. | |
| 6,070,147 A | 5/2000 | Harms et al. | |
| 6,070,241 A | 5/2000 | Edwards et al. | |
| 6,073,140 A | 6/2000 | Morgan et al. | |
| 6,078,892 A | 6/2000 | Anderson et al. | |

(Continued)

FOREIGN PATENT DOCUMENTS

WO    WO 01/84281    11/2001

(Continued)

OTHER PUBLICATIONS

Lanubile, et al., Evaluating Empirical Models for the Detection of High-Risk Components: Some Lessons Learned, 20th Annual Software Engineering Workshop, Nov. 29-30, 1995, Greenbelt, Maryland, pp. 1-6.*

(Continued)

*Primary Examiner* — Wilbert L Starks
(74) *Attorney, Agent, or Firm* — Knobbe, Martens, Olson & Bear LLP

(57) ABSTRACT

Embodiments are directed to data verification of business or consumer data. Certain embodiments include a data verification system that receives or selects data to be verified, selects one or more verification methods to verify, update, and/or append/enhance the data. The data verification system may verify the data with one or more data verification methods, either alone or in combination. The methods may include a web-crawling verification method, an agent web verification method, a call verification method, a direct mail method, an email method, an in-person verification method, or other methods. The system has the ability to, automatically or manually, (1) blend automatic and manual segmentation of records or elements by criteria such as industry type, best times of day/month/year to verify, update, or append, cost, and level of importance (2) select the best verification processing method(s), and (3) manage the results and properly verify, update, append/enhance records.

26 Claims, 8 Drawing Sheets

U.S. PATENT DOCUMENTS

| | | | |
|---|---|---|---|
| 6,157,927 | A | 12/2000 | Schaefer et al. |
| 6,311,169 | B2 | 10/2001 | Duhon |
| 6,321,205 | B1 | 11/2001 | Eder |
| 6,393,406 | B1 | 5/2002 | Eder |
| 6,405,173 | B1 | 6/2002 | Honarvar et al. |
| 6,446,200 | B1 | 9/2002 | Ball et al. |
| 6,457,012 | B1 | 9/2002 | Jatkowski |
| 6,496,827 | B2 | 12/2002 | Kozam et al. |
| 6,523,022 | B1 | 2/2003 | Hobbs |
| 6,523,041 | B1 | 2/2003 | Morgan et al. |
| 6,748,426 | B1 | 6/2004 | Shaffer et al. |
| 6,750,985 | B2 * | 6/2004 | Rhoads ........................ 358/3.28 |
| 6,766,327 | B2 | 7/2004 | Morgan, Jr. et al. |
| 6,804,346 | B1 | 10/2004 | Mewhinney |
| 6,868,389 | B1 | 3/2005 | Wilkins et al. |
| 6,910,624 | B1 | 6/2005 | Natsuno |
| 6,983,379 | B1 | 1/2006 | Spalink et al. |
| 6,983,478 | B1 | 1/2006 | Grauch et al. |
| 6,985,887 | B1 | 1/2006 | Sunstein et al. |
| 7,028,001 | B1 | 4/2006 | Muthuswamy et al. |
| 7,035,855 | B1 | 4/2006 | Kilger et al. |
| 7,043,531 | B1 | 5/2006 | Seibel et al. |
| 7,076,475 | B2 | 7/2006 | Honarvar |
| 7,185,016 | B1 | 2/2007 | Rasmussen |
| 7,188,169 | B2 | 3/2007 | Buus et al. |
| 7,200,602 | B2 | 4/2007 | Jonas |
| 7,251,625 | B2 | 7/2007 | Anglum |
| 7,272,591 | B1 | 9/2007 | Ghazal et al. |
| 7,370,044 | B2 | 5/2008 | Mulhern et al. |
| 7,403,942 | B1 | 7/2008 | Bayliss |
| 7,433,864 | B2 | 10/2008 | Malik |
| 7,451,113 | B1 | 11/2008 | Kasower |
| 7,529,698 | B2 | 5/2009 | Joao |
| 7,672,833 | B2 | 3/2010 | Blume et al. |
| 7,672,865 | B2 | 3/2010 | Kumar et al. |
| 7,672,924 | B1 | 3/2010 | Scheurich et al. |
| 7,672,926 | B2 | 3/2010 | Ghazal et al. |
| 7,689,505 | B2 | 3/2010 | Kasower |
| 2001/0011245 | A1 | 8/2001 | Duhon |
| 2002/0026507 | A1 | 2/2002 | Sears et al. |
| 2002/0069122 | A1 | 6/2002 | Yun et al. |
| 2002/0103809 | A1 | 8/2002 | Starzl et al. |
| 2002/0128962 | A1 | 9/2002 | Kasower |
| 2002/0133504 | A1 | 9/2002 | Vlahos et al. |
| 2002/0138297 | A1 | 9/2002 | Lee |
| 2002/0156797 | A1 | 10/2002 | Lee et al. |
| 2002/0169747 | A1 | 11/2002 | Chapman et al. |
| 2002/0198824 | A1 | 12/2002 | Cook |
| 2003/0009418 | A1 | 1/2003 | Green et al. |
| 2003/0083893 | A1 | 5/2003 | Aliffi et al. |
| 2003/0097380 | A1 | 5/2003 | Mulhern et al. |
| 2003/0101344 | A1 | 5/2003 | Wheeler et al. |
| 2003/0115133 | A1 | 6/2003 | Bian |
| 2003/0195859 | A1 | 10/2003 | Lawrence |
| 2003/0220858 | A1 | 11/2003 | Lam et al. |
| 2004/0015714 | A1 | 1/2004 | Abraham et al. |
| 2004/0015715 | A1 | 1/2004 | Brown |
| 2004/0019518 | A1 | 1/2004 | Abraham et al. |
| 2004/0107132 | A1 | 6/2004 | Honarvar et al. |
| 2004/0117358 | A1 | 6/2004 | Von Kaenel et al. |
| 2004/0143482 | A1 | 7/2004 | Tivey et al. |
| 2004/0167793 | A1 | 8/2004 | Masuoka et al. |
| 2004/0199456 | A1 | 10/2004 | Flint et al. |
| 2004/0230527 | A1 | 11/2004 | Hansen et al. |
| 2005/0027983 | A1 | 2/2005 | Klawon |
| 2005/0044036 | A1 | 2/2005 | Harrington et al. |
| 2005/0058262 | A1 | 3/2005 | Timmins et al. |
| 2005/0065809 | A1 | 3/2005 | Henze |
| 2005/0080821 | A1 | 4/2005 | Breil et al. |
| 2005/0108041 | A1 | 5/2005 | White |
| 2005/0131760 | A1 | 6/2005 | Manning et al. |
| 2005/0154664 | A1 | 7/2005 | Guy et al. |
| 2005/0154665 | A1 | 7/2005 | Kerr |
| 2005/0171859 | A1 | 8/2005 | Harrington et al. |
| 2005/0209922 | A1 | 9/2005 | Hofmeister |
| 2006/0004731 | A1 | 1/2006 | Seibel et al. |
| 2006/0029107 | A1 | 2/2006 | McCullough et al. |
| 2006/0041464 | A1 | 2/2006 | Powers et al. |
| 2006/0041500 | A1 | 2/2006 | Diana et al. |
| 2006/0059110 | A1 | 3/2006 | Madhok et al. |
| 2006/0064340 | A1 | 3/2006 | Cook |
| 2006/0074986 | A1 | 4/2006 | Mallalieu et al. |
| 2006/0106668 | A1 | 5/2006 | Kim et al. |
| 2006/0129422 | A1 | 6/2006 | Kim et al. |
| 2006/0143695 | A1 | 6/2006 | Grynberg |
| 2006/0161435 | A1 | 7/2006 | Atef et al. |
| 2006/0218407 | A1 | 9/2006 | Toms |
| 2006/0229799 | A1 | 10/2006 | Nimmo et al. |
| 2006/0229943 | A1 | 10/2006 | Mathias et al. |
| 2006/0229961 | A1 | 10/2006 | Lyftogt et al. |
| 2006/0253358 | A1 | 11/2006 | Delgrosso et al. |
| 2006/0271457 | A1 | 11/2006 | Romain et al. |
| 2006/0282359 | A1 | 12/2006 | Nobili et al. |
| 2007/0112667 | A1 | 5/2007 | Rucker |
| 2007/0162414 | A1 | 7/2007 | Horowitz et al. |
| 2007/0192122 | A1 | 8/2007 | Routson et al. |
| 2007/0284433 | A1 | 12/2007 | Domenica et al. |
| 2007/0294431 | A1 | 12/2007 | Adelman et al. |
| 2008/0109444 | A1 | 5/2008 | Williams et al. |
| 2008/0109445 | A1 | 5/2008 | Williams et al. |
| 2010/0145840 | A1 | 6/2010 | Baker et al. |

FOREIGN PATENT DOCUMENTS

| | | |
|---|---|---|
| WO | WO 2004/114160 | 12/2004 |
| WO | WO 2005/036859 | 4/2005 |
| WO | WO 2006/110873 | 10/2006 |

OTHER PUBLICATIONS

Li, et al., Automatic Verbal Information Verification for User Authentication, IEEE Transactions on Speech and Audio Processing, vol. 8, No. 5, Sep. 2000, pp. 585-596.*

"Impac Funding Introduces Enhanced Website for Static Pool Tracking of MBS Transactions," Webpage printed out from <http://www.lewtan.com/press/1208044_Impac-Lewtan.htm> on Mar. 20, 2008.

"Need for Leads Spurs Some Upgrades", Special Report, p. 24, vol. 17, No. 8, Copyright 2008 SourceMedia, Inc.

"PrimeQ Lead Validation Techniques Gets Stronger", http://66.102.7.104/search?q=cache:qXAdm0EXcwYJ:www.primeq.com/absolutenm/anmv..., 2 pages, Nov. 29, 2005.

Authenticom, "What's In a Name?", downloaded from http://web.archive.org/web/20070708185835/http://www.authenticom.com/story.html, 1 page, Apr. 1, 2009.

Authenticom, Technical Specs, "Confidence Level Indicators (CLI)", downloaded from http://www.authenticom.com/confidence_level_indicators.shtml, 2 pages, Aug. 17, 2006.

Charles Chung, Internet Retailer, "Multi-channel retailing requires the cleanest data—but don't expect it from the customer", Jan./Feb. 2002.

David Loshin, Intelligent Enterprise: Better Insight for Business Decisions, "Value-Added Data: Merge Ahead", Feb. 9, 2000, vol. 3, No. 3, 5 pages.

Ettorre, Paul Kahn on Exceptional Marketing. Management Review, vol. 38(11), Nov. 1994, pp. 48-51.

Ideon, Credit-Card Registry That Bellyflopped this Year, Is Drawing some Bottom-Fishers, The Wall Street Journal, Aug. 21, 1995, p. C2.

Intelligent Enterprise, Value-Added Data: Merge Ahead, Feb. 9, 2000, vol. 3, No. 3.

International Search Report and Written Opinion for PCT/US07/83055, dated Jan. 7, 2009.

LeadVerifier: Why Should You Use LeadVerifier?, downloaded from www.leadverifier.com/LeadVerifier_Why.asp, Copyright 2005, 2 pgs.

PR Web: Press Release Newswire, "Anchor Launches LeadVerifier to Verify, Correct and Enhance Internet Leads", 2 pages, Aug. 8, 2005.

Rap Interactive, Inc. and Web Decisions, "LiveDecisions", 2 pages, Publication date unknown.

Real IQ, "Lead Metrix", downloaded from http://www.realiq.com/leadmetrix.html, 1 page, Aug. 17, 2006.

Real IQ, "Mortgage Industry", downloaded from http://www.realiq.com/mortgage.html, 4 pages, Aug. 17, 2006.

ServiceObjects, "DOTS Web Services—Product Directory", downloaded from http://www.serviceobjects.com/products/directory_of_web_services.asp, 4 pages, Aug. 17, 2006.

ServiceObjects, "Real-Time Customer Intelligence for a Nickel", downloaded from http://www.serviceobjects.com/products/default.asp, 3 pages, Aug. 17, 2006.

TARGUSinfo: "Intermark Media Slashes Returned Lead Costs, Improves Affiliate Relations," downloaded from www.targusinfo.com, 4 pgs.

TARGUSinfo: Lead Verification, Verify Your Leads With Unique Accuracy and Ease, downloaded from www.targusinfo.com/solutions/verify/Default.asp, Copyright 2004-2006.

Web Decisions, "Live Decisions", downloaded from http://www.webdecisions.com, 2 pages, Sep. 18, 2006.

* cited by examiner

SYSTEMS AND METHODS FOR DATA VERIFICATION

CROSS-REFERENCE TO RELATED APPLICATIONS

This application is based upon and claims the benefit of priority from U.S. Provisional Patent Application No. 60/921,188 filed on Mar. 30, 2007, entitled "Systems and Methods for Data Verification," the entire contents of which are hereby incorporated herein by reference in their entirety. All publications and patent applications mentioned in this specification are herein incorporated by reference in their entirety to the same extent as if each individual publication or patent application was specifically and individually indicated to be incorporated by reference.

BACKGROUND

1. Field

The present disclosure relates to the field of data verification, more particularly to improved methods and systems for verifying and/or updating data.

2. Description of the Related Art

Companies increasingly rely on internal and external data relating to their existing or potential customers in order to make critical business strategy decisions. Therefore, a business need exists for systems and methods for verifying the integrity and quality of such data.

SUMMARY OF THE DISCLOSURE

Embodiments are directed to data verification of business or consumer data. One embodiment is a data verification system that receives or selects data to be verified, selects one or more verification methods to be applied to the data, and verifies, updates, and/or appends/enhances the data.

In certain embodiments, the data verification system and/or method is configured to verify one or more types of data. The data may include, for example, business data, non-profit data, government data, credit data, financial data, securities data, consumer data, individual data, pet data, web-posting data, shopping data, email data and the like. In certain embodiments, the data verification system is configured to verify the data in one or more languages or formats or codes or the like.

In certain embodiments, the data verification system is configured to verify data with one or more data verification methods, either alone or in combination. The methods may include a web-crawling verification method, an agent web verification method, a call verification method, a direct-mail method, an email method, an in-person method, and/or other methods. The system may utilize a lower cost method to first verify a larger amount of data records and a higher cost method to verify a smaller amount of data records. The system may segment data into multiple segments/elements and apply a different data verification method to each segment/element.

Certain embodiments of the system comprise an artificial intelligence module that checks the accuracy and costs of the data verification methods as well as other business logic (for example, best time of day/month/year to verify) and dynamically adjusts the usage of the verification methods to meet certain pre-defined business objectives (for example, to achieve the highest accuracy at the lowest cost).

One embodiment is an automated system for verifying data comprising a data selection module configured to select at least a portion of data to be verified, and an artificial intelligence module configured to select one or more data verification methods, based on prior results of the use of the one or more data verification methods, from web-crawling, tele-verification, agent web verification, direct-mail verification, email verification, and in-person verification to apply to the selected portion of the data, wherein the data is verified, updated, or appended as a result the application of the one or more selected data verification methods to the selected portion of the data. In another embodiment, the system may further comprise cost data stored on the system indicating the cost of the data verification methods, and the artificial intelligence module is further configured to select two data verification methods using the cost data for the two data verification methods, wherein the selected data verification method with the lower cost is applied to the selected portion of the data, and the selected data verification method with the higher cost is applied to a subset of the selected portion of the data.

Another embodiment is an automated system for verifying data comprising a data segmentation module configured to segment data to be verified into a plurality of data portions, wherein each data portion comprises a characteristic and an artificial intelligence module configured to select a data verification method to apply to each of the plurality of data portions based on the characteristic of the data portion, wherein data is verified, updated, or appended as a result of the application of the selected data verification method.

Yet another embodiment is an automated method of data verification, comprising: selecting a portion of data to be verified; and selecting one or more data verification methods from web-crawling, tele-verification, agent web verification, direct-mail verification, email verification, and in-person verification to apply to the selected portion of the data, based on prior results of the use of the data verification methods, wherein the data is verified, updated, or appended as a result the application of the one or more data verification methods to the selected portion of the data. In another embodiment, the method may further comprise: storing cost data indicating the cost of data verification methods; and the selecting one or more data verification methods comprises selecting two data verification methods using the cost data for the two data verification methods, wherein the selected data verification method with the lower cost is applied to the selected portion of the data, and the selected data verification method with the higher cost is applied to a subset of the selected portion of the data.

Another embodiment is an automated method for verifying data comprising: segmenting data to be verified into a plurality of data portions, wherein each data portion comprises a characteristic; and selecting a data verification method to apply to each of the plurality of data portions based on the characteristic of the data portion, wherein data is verified, updated, or appended as a result of the application of the selected data verification method.

Another embodiment is a computer program product comprising a computer usable medium having control logic stored therein for causing a computer to verify data, the control logic comprising: a first computer readable program code means for causing the computer to select a portion of data to be verified; and a second computer readable program code means for causing the computer to select one or more data verification methods, based on prior results of the use of the one or more data verification methods, from web-crawling, tele-verification, agent web verification, direct-mail verification, email verification, and in-person verification to apply to the selected portion of the data, wherein the data is verified, updated or appended as a result the application of the one or more selected data verification methods to the selected portion of the data.

Finally, one embodiment is a computer program product comprising a computer usable medium having control logic stored therein for causing a computer to verify data, the control logic comprising: a first computer readable program code means for causing the computer to segment data to be verified into a plurality of data portions, wherein each data portion comprises a characteristic; and a second computer readable program code means for causing the computer to select a data verification method to apply to each of the plurality of data portion based on the characteristic of the data portion, wherein data is verified, updated or appended as a result of the application of the selected data verification method.

BRIEF DESCRIPTION OF THE DRAWINGS

Specific embodiments of the invention will now be described with reference to the following drawings, which are intended to illustrate embodiments of the invention, but not limit the invention.

DETAILED DESCRIPTION OF PREFERRED EMBODIMENTS

To make critical business strategy decisions, companies often rely on internal and external data relating to their existing or potential customers. For example, some companies may conduct target marketing campaigns directed at prospective customers exhibiting characteristics of a certain market demographic, such as households with children located in the Midwest. Accordingly, these companies may obtain a listing of such households from a third party data provider. To ensure that these companies are effectively targeting the desired market segment, it is best for the consumer data to be accurate and updated. Therefore, systems and methods are needed to check and update such consumer data or business data.

The same is true for any sort of business data whether generated internally by a company or obtained from a third party data provider. For example, a company may want to market loan products to small businesses in the restaurant supply industry. However, in many instances companies simply have too much data or not enough resources to check and update the consumer or business data. Furthermore, companies often need some or all of the data on a real-time basis, thereby preferring that such data be verified and updated continuously or periodically. For purposes of summarizing the embodiments of the invention certain aspects, advantages and novel features of the systems and methods for verifying the integrity and quality of data will be described herein. Of course, it is to be understood that not necessarily all such aspects, advantages or features will be embodied in any particular embodiment of the invention.

Data Verification Overview

Figure 1:
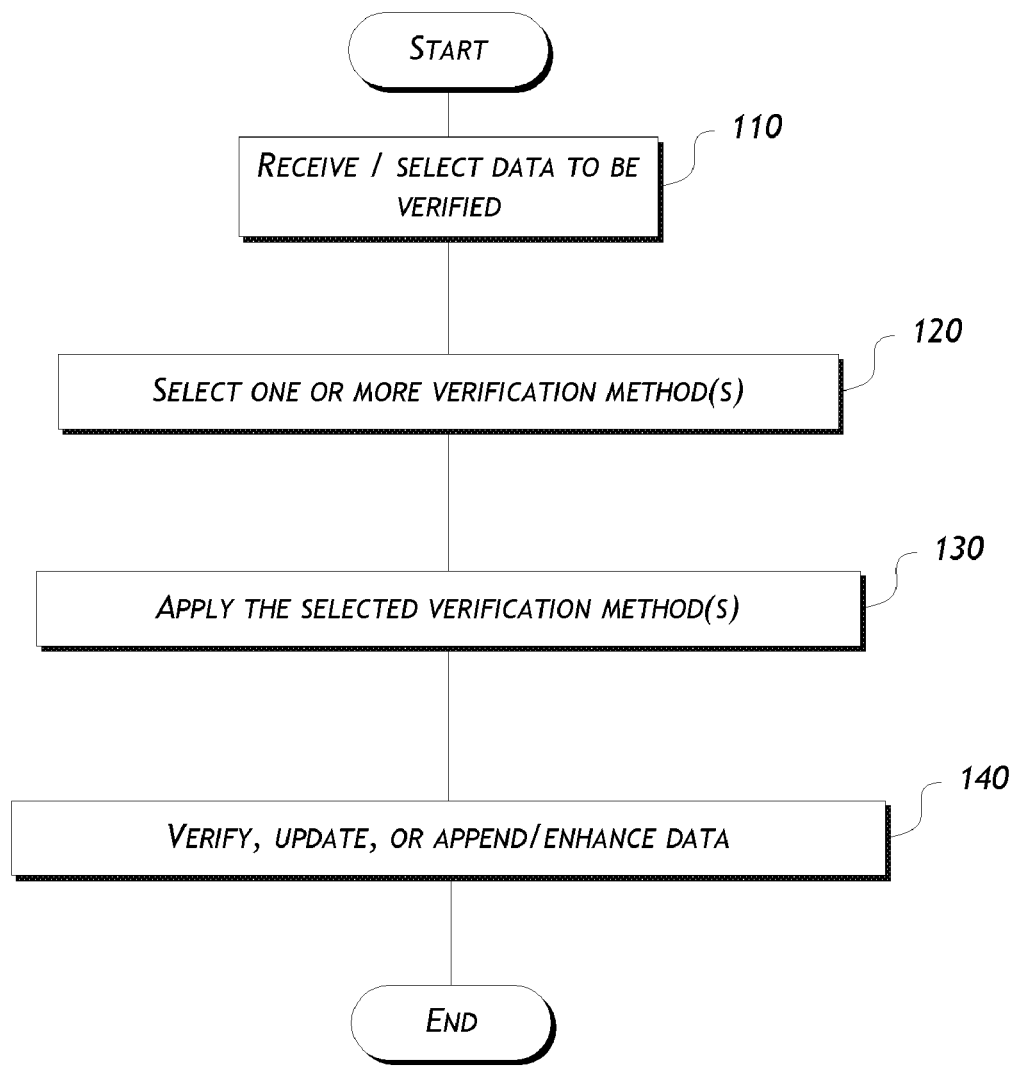
FIG. 1 illustrates a method of data verification according to one embodiment.

FIG. 1 shows a method of data verification in accordance to one embodiment. At block 110, the data verification system receives or selects data to be verified. The system may receive data from an external source, or may select data from a database connected to the system. At block 120, the system selects one or more verification methods to be applied to the data. At block 130, the system applies the selected one or more verification methods to verify the data. At block 140, as a result of the data verification process, data may be verified, updated, and/or appended/enhanced.

In certain embodiments, a data record comprises a plurality of data elements. For example, a data record for a company may comprise data elements such as company name, company size, executive listings, address, and so forth. When a data record is verified, the original content of the record is saved. The record may also be saved along with a time identifier to indicate the time of the verification. When a data record is updated, part of the data record (for example, one or more elements) is altered. For example, the phone number of a company data record may be updated while the address remains unchanged. Finally, when a data record is appended or enhanced, additional information is newly added to the data record. For example, during the verification process it may be discovered that a company has 50 employees. The number of employees will thus be added as a new data element to the record for the company. Another example of appending or enhancing may involve discovering a relationship between two or more data records (for example, company A is a subsidiary of company B or individual A is married to individual B) and adding a relationship link between/among the records.

In certain embodiments, the data verification system and/or method is configured to verify one or more types of data. The data may include, for example, business data, non-profit data, government data, credit data, financial data, securities data, consumer data, individual data, pet data, web-posting data, shopping data, email data and the like. In certain embodiments, the data verification system is configured to verify the data in one or more languages or formats or codes or the like. In certain embodiments, the data verification system is configured to translate or standardize the data into one language, for example English, or into a standard format or code or the like before comparing the data to existing data or before storing the data in a database. Data may be segmented by industries, by types, by data having common elements suitable to be verified by a similar method, and/or by other criteria.

Figure 2:
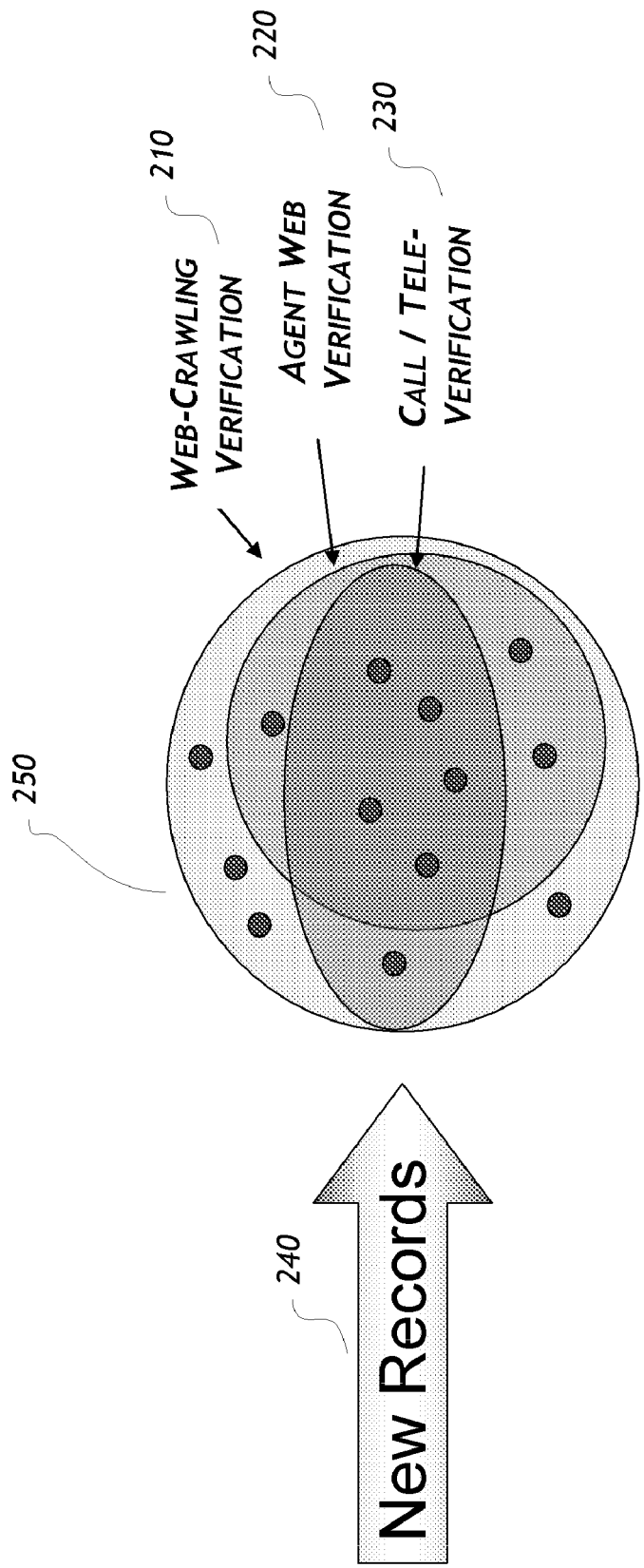
FIG. 2 is a Venn diagram that shows how data verification methods are used in accordance to one embodiment.

FIG. 2 is a Venn diagram that shows how data verification methods are used in accordance to one embodiment. A plurality of new data records 240 may be received into the data verification system. The system selects a portion of data records 250 and applies a specific data verification method to the selected portion. In certain embodiments, the system chooses from a web-crawling verification method 210, an agent web verification method 220, and a call verification/tele-verification method 230. In other embodiments, other verification methods such as direct postal mail, email, or in-person verification may be used as well. As shown in the Venn diagram, some data records (represented by dots) may be verified by multiple methods while some data records may be verified by one method. In other embodiments, some methods will be applied to certain data elements/segments. For example, web-crawling may be applied to verify/update/append the phone number and address elements while call/tele-verification may be applied to verify/update/append other elements such as company names and owner's names.

Figure 3:
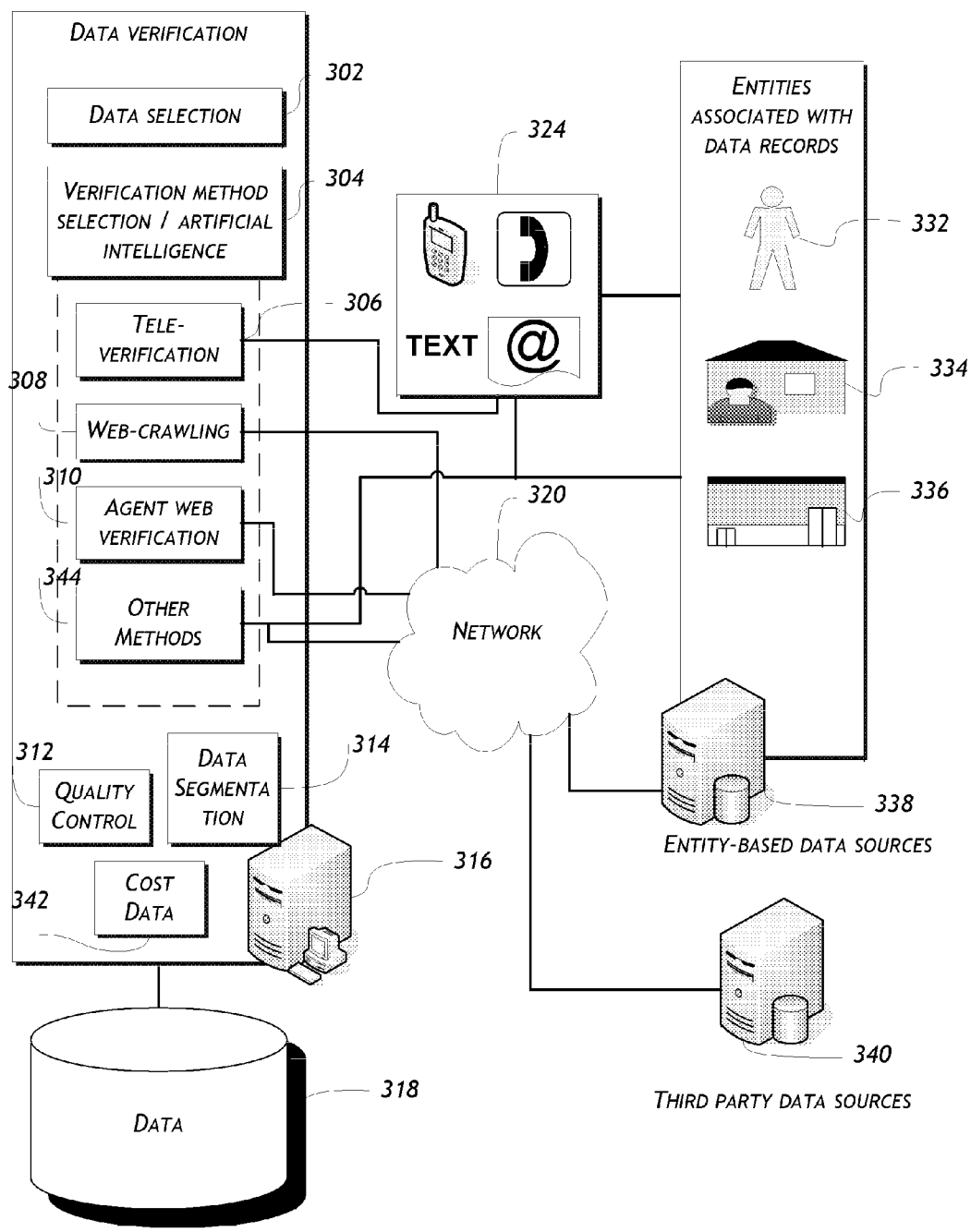
FIG. 3 illustrates an example configuration of a data verification system and its components according to one embodiment.

FIG. 3 shows a data verification system in accordance to one embodiment. A data verification module 300 is a computer executable program executed on a computer server 316. The computer server 316 is in communication with one or more databases 318 that house data.

In certain embodiments, the data verification module 300 includes a data selection module 302, a verification method selection/artificial intelligence module 304, and one or more data verification method modules. The data verification module 300 may additionally include a quality control module 312 and/or a data segmentation module 314. The quality control module 312 performs quality control and/or rank the accuracy of data verification methods in some embodiments. In certain embodiments, the data segmentation module 314 segments data by data elements or segments according to certain characteristics by which data verification method may be selected. The data verification module 300 may include a cost data module 342 to monitor and/or store cost data associated with various data verification methods. Other embodiments combine or separate into fewer or more modules.

The data selection module 302 selects a plurality of data records from the one or more database(s) 318 for the verification. In certain embodiments, the verification method selection/artificial intelligence module 304 selects one or more data verification modules to execute (within the dotted box in FIG. 3). The selection may be based in part on a set of business rules, some of which may maximize cost, efficiency, and accuracy of the various verification methods, or may be based in part on the artificial intelligence module 304 monitoring and learning the performance of various verification methods and adjusting the selection accordingly.

In the sample embodiment shown in FIG. 3, the data verification method modules include a tele-verification module 306, a web-crawling module 308, an agent web verification module 310, and an other verification methods module 344, which may include methods such as direct mail, in-person verification, and so forth. In certain embodiments, the tele-verification module 306 contacts entities associated with the selected data records through communication channels 324. The entities may be individuals 332, households 334, or businesses 336. The term "entity" as used herein can comprise without limitation individuals, households, businesses, non-profit organizations, governments, or the like. Communications channels 324 may include telephone, cellphone, text messaging, email, or the like. The web-crawling module 308 may communicate through a network 320 (for example, internet, local area network (LAN), wide area network (WAN), wireless network) to access information located on data sources 338, which may be maintained by entities associated with the data records to be verified. The web-crawling module 308 may also access data located on other third-party data sources 340 such as commercial data sources or governmental data sources. Finally, the agent web verification module 310 may similarly access information maintained on data sources 338, data sources 340 and/or other available sources. These verification method modules verify, update, and/or amend/enhance the selected data records. Each of these data verification methods is further described below.

Web-Crawling

In certain embodiments, the data verification system and/or method selects at least a portion of the data to be verified, and causes the selected data to be verified by the web-crawling-type methodology or web-crawling module 308. In certain embodiments, the terms "web-crawler" or "web-crawling" as used herein include without limitation, for example, web spider, web robot, watching, scraping, harvesting, content monitoring, extraction or other like technologies. In certain embodiments, the web-crawling module 308 comprises a computer program system that selects certain data and compares the data with similar data obtained from searching sources, such as via the internet.

By way of example and with reference to FIG. 3, web-crawling module 308 may access data sources 338 and/or 340. For example, the web-crawling module 308 may extract information from a personal page maintained by an individual 332 on a social network site 340. Alternatively, the web-crawling module 308 may extract information from a web site on the company server 338 maintained by a business 336. In addition, the web crawling module 308 may search several internet data sources 340, including but not limited to company websites, directories, search engines, chamber of commerce websites, yellow page directories, white page directories, government data, directory data, chamber of commerce data, franchise data, business financial data, business owner data, securities reports or filing data, news article data, press release data, online databases, and the like. The web crawling module 308 may utilize data findings for corroboration of other data sources as well. For example, certain data elements or data records for certain industry segments may require three sources of corroboration before a verify, an update, and/or an append is executed. The web-crawling results for may thus be one source of that corroboration. In one embodiment, the administrator of the data verification system may set a system-wide or segment-specific policy to decide how many additional sources of corroboration are required before the web-crawling results are used to verify, update, and/or append.

In certain embodiments, web-crawling is performed worldwide on data sources located anywhere in the world. In certain embodiments, the data verification system compares and updates the data based on the data found from the web-crawling. In certain embodiments, the various internet data sources have a pre-determined trustworthiness ranking. In certain embodiments, the web-crawling method or program uses such trustworthiness ranking to determine whether to update consumer data based on the data from a particular internet data source.

In certain embodiments, the data verification system completes the web-crawler comparing and updating automatically. In certain embodiments, automatic updating is completed where there is no discrepancy between the data and the data obtained from one or more of the several internet data sources. In certain embodiments, automatic updating is completed when the internet data source has a high trustworthiness ranking. In certain embodiments, the data verification system presents to an operator the original data, and the data found from the web-crawling. In certain embodiments, an operator of the data verification system compares the original data with the data found from web-crawling and based on such a comparison, the operator directs the data verification system to update the data with or ignore the data found from the web-crawling. In certain embodiments, the operator manually updates the data.

In certain embodiments, web-crawling comprises the use of watching technology that monitors, for example, a certain website for updates to the website such that the data is only updated when website updates are detected. In certain embodiments, the data verification system updates the data when the system receives a notification from the watching technology. In certain embodiments, updates to the website includes without limitation, for example, changes in text, images or other information provided on the website; or increases/decreases in: traffic to the website, number of unique visitors to the website, purchases transacted on the website, average user duration on the website or any other website metrics or analytics; or changes in related business or industry trends, financial market valuations or any other business intelligence indicator. In certain embodiments, the website metrics or analytics is provided by third party providers including without limitation, for example, Google Inc, onestat.com, or the like.

In certain embodiments, the web-crawler automatically determines whether to update the data based on a date and time comparison, wherein, for example, the web-crawler updates the existing data with the new data found on the internet if the internet data comprises a more recent creation date and/or time. In certain embodiments, the web-crawler determines the creation date and time of the newly found internet data by analyzing the date stamp information stored on the webpage or in the code of the webpage. In certain embodiments, the web-crawler or other system is configured to update the existing data with newly found data, and store in a database the corresponding stamp date and/or time information related to the newly found data. In certain embodiments, the stored stamp date and/or time data is compared with newly discovered internet data to determine whether such internet data was more recently created. In addition, to websites, the web-crawler may monitor a variety of systems, data sets, and applications, including a network of computers, application data, database data, and so forth. In certain embodiment embodiments, some or all of the web-crawling may be performed by a third party, such as, for example 365 Media, Velocityscape, and the like. Other embodiments of the foregoing will be apparent to those of ordinary skill in the art from the disclosure herein.

Agent Web Verification

Figure 4:
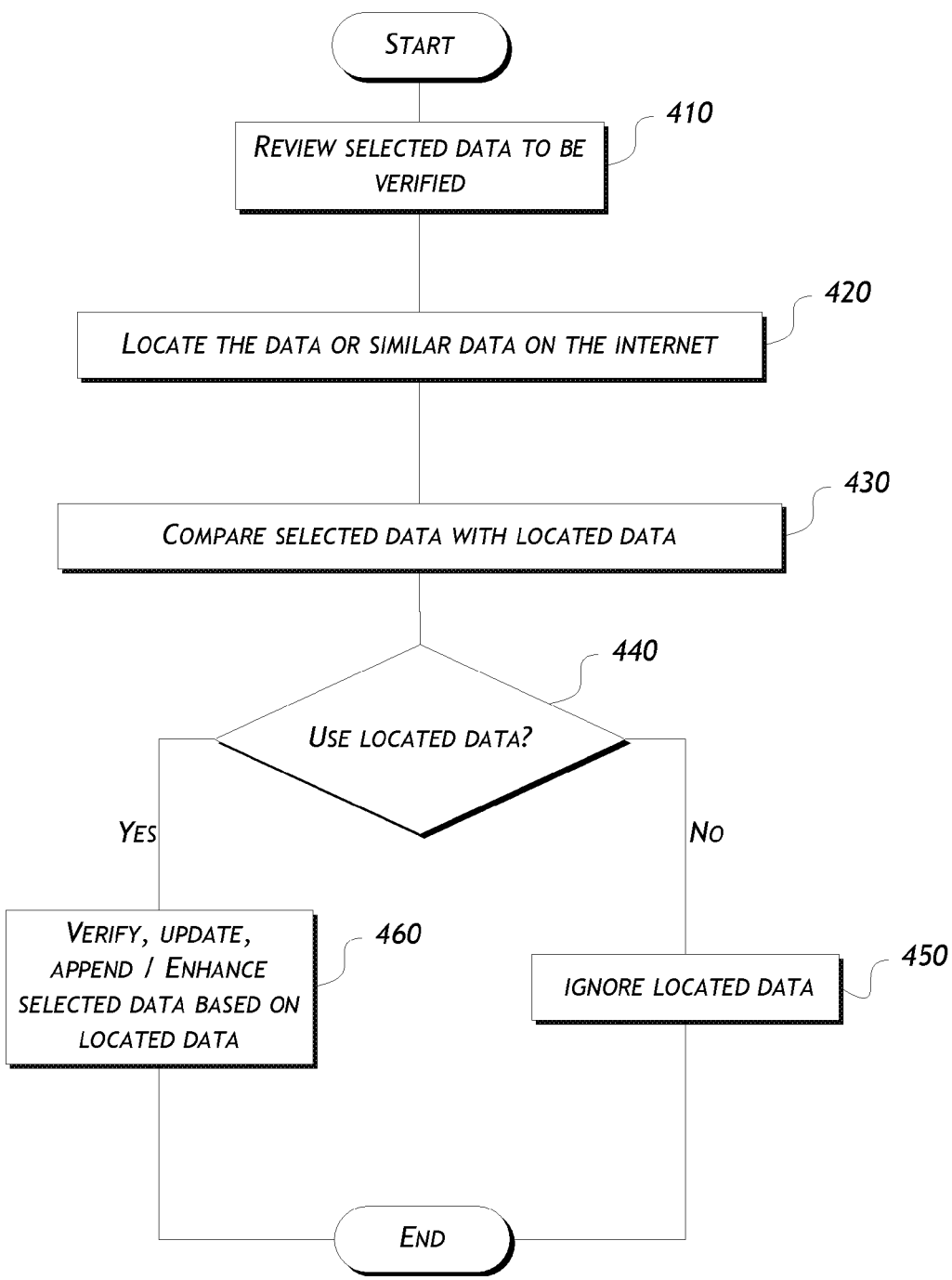
FIG. 4 is a flow diagram of an example web-crawling data verification method according to one embodiment.

In certain embodiments, the data verification system and/or method selects at least a portion of the data to be verified, and causes the selected data to be verified by the agent web verification module 310. FIG. 4 shows one embodiment of the agent web verification method. At block 410, at least one agent, preferably multiple agents, review the selected data. At block 420, the agent(s) locate the data or similar data available on the internet. At block 430, the agent(s) compare the selected data to the data found on the internet in order to verify the quality of the selected data (for example, completeness, accuracy, and so forth). At block 440, the agent(s) determine whether to verify, update, and/or append the selected data based on the data found on the internet. If so, at block 450, the agent(s) update the selected data. Otherwise, at block 460, the agents ignore the located data.

In certain embodiments, agents are located at a central location wherein they have access to the data verification system via one or more network connections, such as, for example, a local area network (LAN) connection or the like. In certain embodiments, agents are located at distributed or multiple locations wherein the agents have access to the data verification system via one or more network connections, such as, for example, a wide area network (WAN) connection or the like.

Call/Tele-Verification

Figure 5:
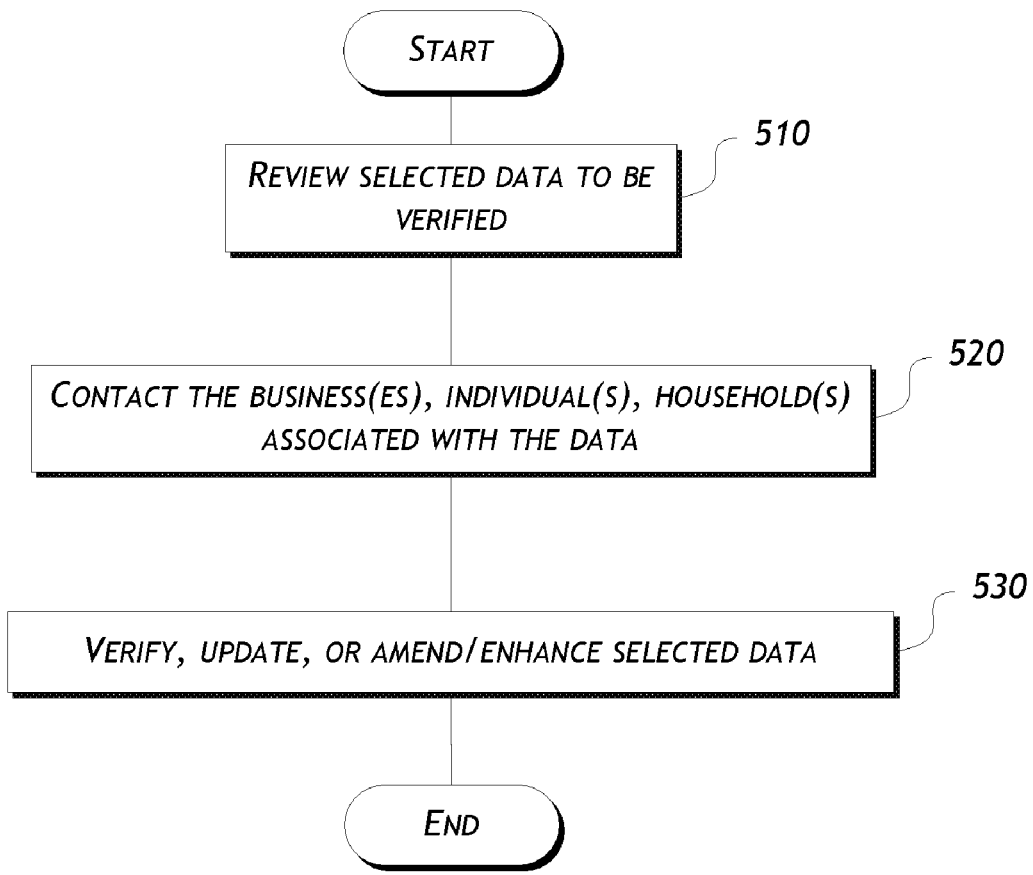
FIG. 5 is a flow diagram of an example tele-verification method according to one embodiment.

In certain embodiments, the data verification system and/or method selects at least a portion of the data to be verified, and causes the selected data to be verified by a call verification methodology. FIG. 5 shows one embodiment of the call verification method, which may be performed by the tele-verification module 306. At block 510, at least one caller, preferably multiple callers, review the selected data. The caller may be a human or may be an automated calling program executed on a computer or an electronic device. At block 520, the caller(s) contact the business(es), the individual(s), the household(s) or other entities associated with the data in order to verify, update, append/enhance the data. At block 530, the caller(s) may verify, update, append/enhance the data based on the results obtained at block 520.

In certain embodiments, the callers use predefined scripts and/or customized scripts in making their calls. Customized scripts may be used for special industry segments. The scripts are configured to increase the number of data points that can be verified and/or to maintain a favorable call experience for the recipient of the call. In certain embodiments, the callers may be monitored by monitoring agents who can provide feedback to the callers to improve future call experiences.

By way of example and with reference to FIG. 3, the tele-verification module 306 or callers may contact individuals 332, households 334, and businesses 336 by various communication channels 324, including telephoning, emailing, mailing, internet calling, text-messaging, instant messaging, video messaging, voice-mailing, faxing or the like.

In certain embodiments, the callers determine whether to update the data with the information received from the contacting or ignore the information received from the contacting. The callers may be located at a central location wherein they have access to the data verification system via a network or the like, or they may be located at multiple locations, for example, a satellite office or the caller's home, wherein the caller has access to the data verification system via a network or the like. In certain embodiments, callers may be located at one or more countries across the globe.

In certain embodiments, the data verification system allows the callers to perform the contacting through the network and over the internet through voice over internet protocol (VOIP) technology. In certain embodiments, the callers are situated or designed to work with a team wherein the team makes calls to verify one or more selected types of data and/or to verify data from one or more selected data types. The teams are segmented to better utilize the callers, and may, for example, be segmented based on strengths and/or weaknesses of the data and/or the callers. For example, certain agents are trained to verify, update, and/or append certain data elements or data records for certain industry segments.

In certain embodiments, some or all of the call verification maybe performed by a third party provider such as, for example, ePerformax, eTelecare, Direct Mail, and the like. Other embodiments of any of the foregoing will be apparent to those of ordinary skill in the art from the disclosure herein.

Hybrid Method

In certain embodiments, the data verification system and/or method uses a combination of at least two of the verification methods described above (web-crawling, agent web verification, call/tele-verification, direct mail, email, in-person or other methods) to verify the data. The verification system includes a verification method selection/artificial intelligence module 304 that selects the appropriate data verification method(s). In certain embodiments, the data verification system and/or method selects at least a portion of the data to be verified by one of the foregoing verification methods, while selecting another portion of the data to be verified by another one of the foregoing verification methods.

Figure 6:
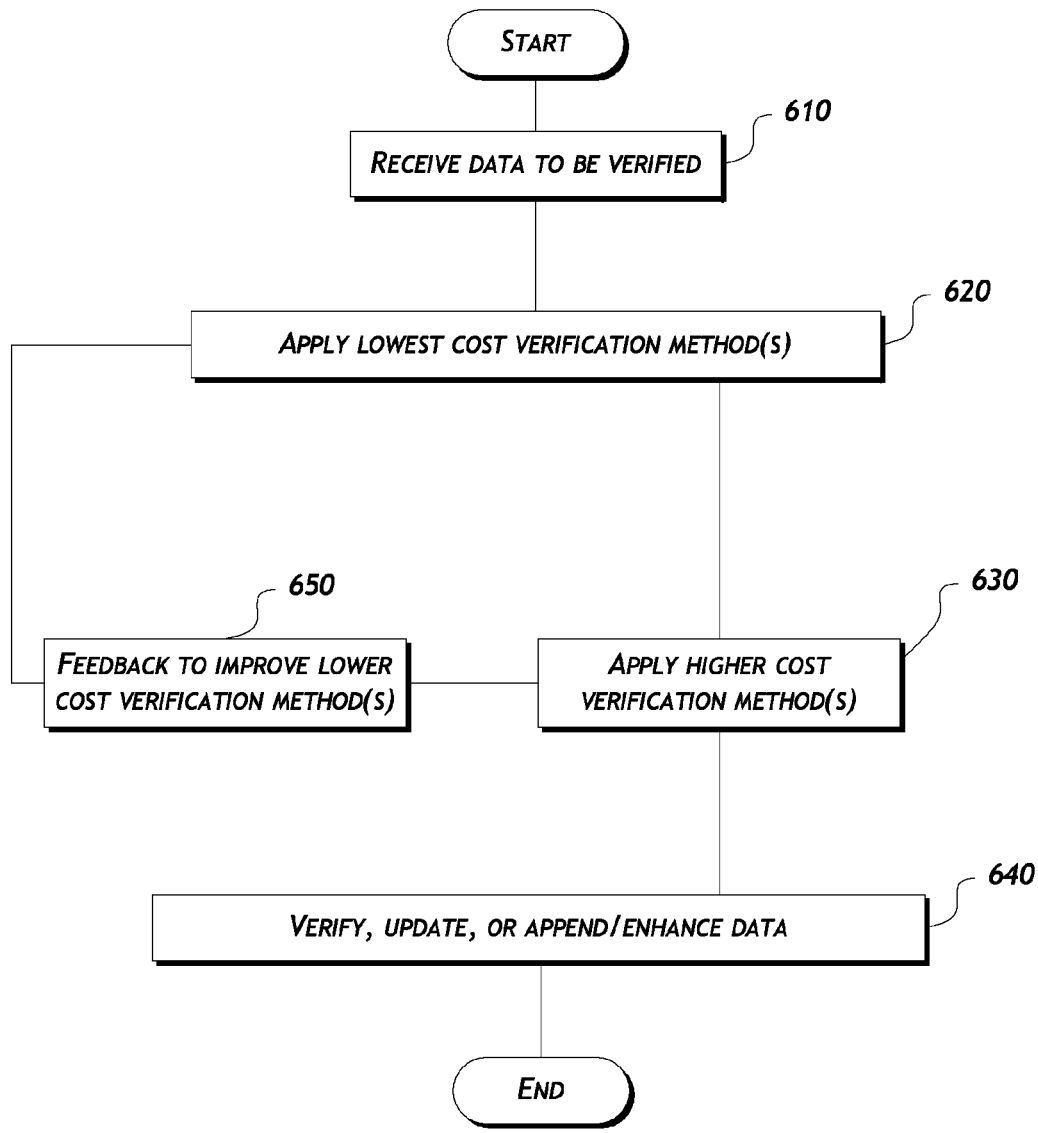
FIG. 6 is a flow diagram showing how data verification methods are selectively applied by segments/elements according to one embodiment.

FIG. 6 shows a sample method of applying data verification methods. At block 610, data to be verified is received. At block 620, a low cost verification method is used to verify the data received at block 610. Then at block 630, a higher cost verification method is used to verify the data. The higher cost verification method may be applied to all the data that is verified by the low cost method at block 620, or may be applied to a portion of the data that is verified by the low cost method. The data is verified, updated, or appended/enhanced depending on the results of the verification performed at block 620 and/or block 630. In certain embodiments, at block 650, the results of the higher cost verification method applied at block 630 are sent back as feedback to improve the results of the low cost verification method. Examples of this feedback may include the types of data records that can be verified solely with a low cost method, or the types of data records that should be verified with a higher cost method. For example, in certain embodiments, the data verification system executes a web-crawling verification method at block 620 and then monitors or tracks the agent's determinations to rank the trustworthiness of the internet data sources at block 630. In certain embodiments, such trustworthiness ranking data is used as feedback at block 650 to improve the accuracy of the web-crawling module executed at block 620. It is recognized that the blocks in FIG. 6 can be rearranged to accommodate various configurations, for example, a higher cost method may be used first.

Data Segmentation

Returning to FIG. 3, in certain embodiments the data verification system includes a data segmentation module 314 that segments data. In certain embodiments, the data verification system and/or method is configured to segment the data to determine which data elements relate to high value customers or clients. For example, the determination of whether a customer or client is high value or otherwise is based on several factors, including but not limited to income, home location, net worth, credit score, and so forth. Based on the segmentation, the data verification system may verify the segmented data relating to high value customers or clients before segmented data relating to lower value customers or clients. Data designated as high value or high priority may be verified by call/tele-verification or by the verification method that is most accurate. In certain embodiments, the data verification system is configured to have high value or high priority data verified by a combination of the foregoing verification methods in order to double check the accuracy of the data (for example, the combination shown in FIG. 6).

In certain embodiments, the data verification system and/or method uses the data verification methodology with the highest or higher accuracy, or highest or higher ranking, as set forth above, to verify the segmented data relating to high value customers or clients. In certain embodiments, the data verification system and/or method uses the data verification methodology with the lowest or lower accuracy or lowest or lower ranking, as set forth above, to verify the segmented data relating to low value customers or clients.

In certain embodiments, the data verification system and/or method uses the data verification methodology with a medium accuracy or medium ranking to verify the segmented data relating to medium value customers or clients. In certain embodiments, the data verification system and/or method is configured to segment the data as soon as the data is received, or on a periodic basis, for example, daily, monthly, yearly or the like. Other embodiments of any of the foregoing will be apparent to those of ordinary skill in the art from the disclosure herein.

In certain embodiments, the data verification system performs a segmentation of the data based on related industry and/or timing, and determines which verification methodology is most or more accurate or least or less expensive for collecting data related to the industry and/or timing. For example, for financial reporting data, the data verification system, in certain embodiments, is configured to use the web-crawling methodology to retrieve financial data from a specific financial data reporting website during earnings reporting season. For example, the web-crawling method may be configured to access 10-K reports of companies two weeks after they are required to file the reports with the Securities and Exchange Commission. In certain embodiments, the data verification system is configured to automatically route the data to be verified to the appropriate verification methodology, for example, call verification wherein the caller is part of a virtual call center that allows the caller to work from home.

In certain embodiments, data is segmented so that new data is verified by higher cost methods, and older data is verified by lower cost methods or vice versa. In other embodiments, data is segmented to ensure proper compliance with local, state, federal, national, and/or international laws/regulations. For example, consumer data may be segmented to take into account that consumer data regulation is stricter than business data regulation. Data may also thus be segmented by geographic locations to ensure proper compliance with local laws and regulations.

Artificial Intelligence

In certain embodiments, the data verification system/method includes an automated, artificial intelligence module 304 that evolves by tracking and learning patterns of successful updates, usability, best practices within segments of data, timing of year/month/day to attain best verification/updates/appends, and so forth. The artificial intelligence module 304 may take into account results generated by both the quality control module 312 and the segmentation module 314. In certain embodiments, the system/method including the artificial intelligence module 304 has the ability to, automatically or manually, (1) blend automatic and manual segmentation of records or elements by criteria such as industry type, best times of day/month/year to verify, update, and/or append, cost, and level of importance (2) select the best verification processing method(s), and (3) manage the results and properly verify, update, append/enhance records.

In certain embodiments, the artificial intelligence module 304 is configured to store and track the time period or season when a particular verification method produces the most or more accurate results and/or least or less expensive results and/or the most or more efficient results. In certain embodiments, the artificial intelligence module 304 is configured to store industry information related to the data such that the system is configured to determine which verification method to use given a particular industry and/or season/time period.

In certain embodiments, under the hybrid method and/or the tele-verification method, the processing of data (full records or specific elements of the records) may run through multi-tiered levels of verification/updates/appends depending on type/segment of data in order to gain the best data with the least related expense. With respect to FIG. 7, the sample multi-tiered method receives data to be verified at block 710. Then data is segmented into a plurality of segments and an appropriate data verification method is determined for each segment. In addition, the order in which the data verification methods are applied may also be determined. In certain embodiments, the data verification methods and their order of execution may be determined by the verification method selection/artificial intelligence module 304.

At block 730, a first data verification method is applied to a first segment of the data. Then, at block 740, a second data verification method is applied to a second segment of the data. Finally, at block 750, a third data verification method is applied to a third segment of the data. As shown by block 760, the number of data verification methods and the number of segments can be any number and are not limited to the example shown in FIG. 7. In addition, the data verification method for each segment does not have to be different, that is, the same data verification method may be applied to multiple segments. At each block where a segment is being verified, the results may be sent as feedback to improve the learning of the verification method selection/artificial intelligence module 304. In addition, at each block where a segment is being verified, data may be verified, updated, or amended/enhanced according to the results of the data verification (block 770). In other embodiments, the data is segmented by different elements and methods of verification are selected based on the characteristics of the elements.

Figure 7:
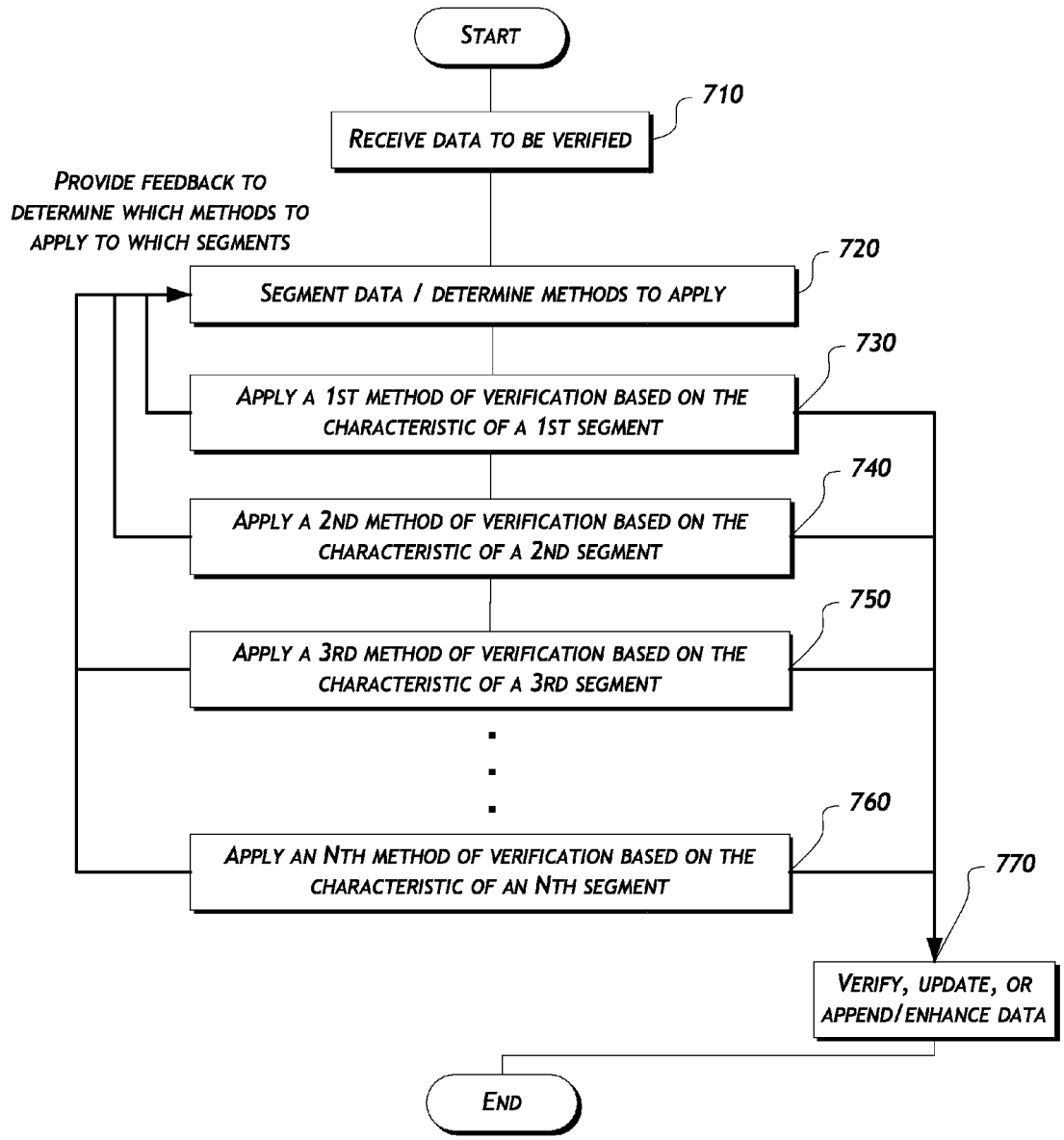
FIG. 7 is a flow diagram showing how data verification methods are selectively applied according to one embodiment.

The method shown in FIG. 7 may be further illustrated by the following example. For data records within the Business Services industry segment, the artificial intelligence module 304 could recognize or learn from feedback obtained from past operations that the best way to verify/update/append this type of data records is by (1) routing the main demographic elements (name, address, phone) to a automated dialing process to test connectivity of phone, (2) using the web-crawling process to extract on-line information or check automated postal deliverability system for address element updates, and (3) sending the data records to the tele-verification method for population of other in-depth data elements. The dialing process may be a one-dial process that puts phones on an automatic dialer during off-hours or on weekends. In one embodiment, the artificial intelligence module selects a lower cost data verification method (for example, web-crawling) for a data segment/element that has a characteristic indicating reliable data is readily available on-line and a higher cost data verification method (for example, agent web verification or tele-verification) for another data segment/element with a characteristic indicating reliable data is not readily available on-line.

In certain embodiments, the data verification system is configured to include one or more methods depending on the cost. Balancing against the cost of each verification method is the fact certain data elements or certain industry segments are more valuable than others. For example, a business name element is more valuable than other details of the business, and a data record in the business segment is more valuable than a data record in the government segment. Therefore, some valuable data elements/segments may be verified by multiple methods, including an expensive method such as call/tele-verification, while other data elements/segments may have a cost threshold that allow only certain data verification methods to be used. The artificial intelligence module may take the cost of verification and the value of the data elements and/or segments into account when it selects the verification method. As another example, the web-crawling may include one or more data sources that charge fees for their use such that using the web-crawling on those data course may exceed a threshold cost. In other embodiments, other costs may be considered.

In certain embodiments, the data verification system is configured to process the data on a real-time basis. In certain embodiments, the data verification system is configured to process the data on a batch processing or periodic basis.

Quality Control/Method Ranking

In certain embodiments, the data verification system is configured to compare the accuracy of the foregoing data verification methods and rank the methods. In certain embodiments, the results of quality control and ranking performed by the quality control module 312 are sent to the artificial intelligence module 304 to assist the learning process and enhance future selection of data verification methods.

Figure 8:
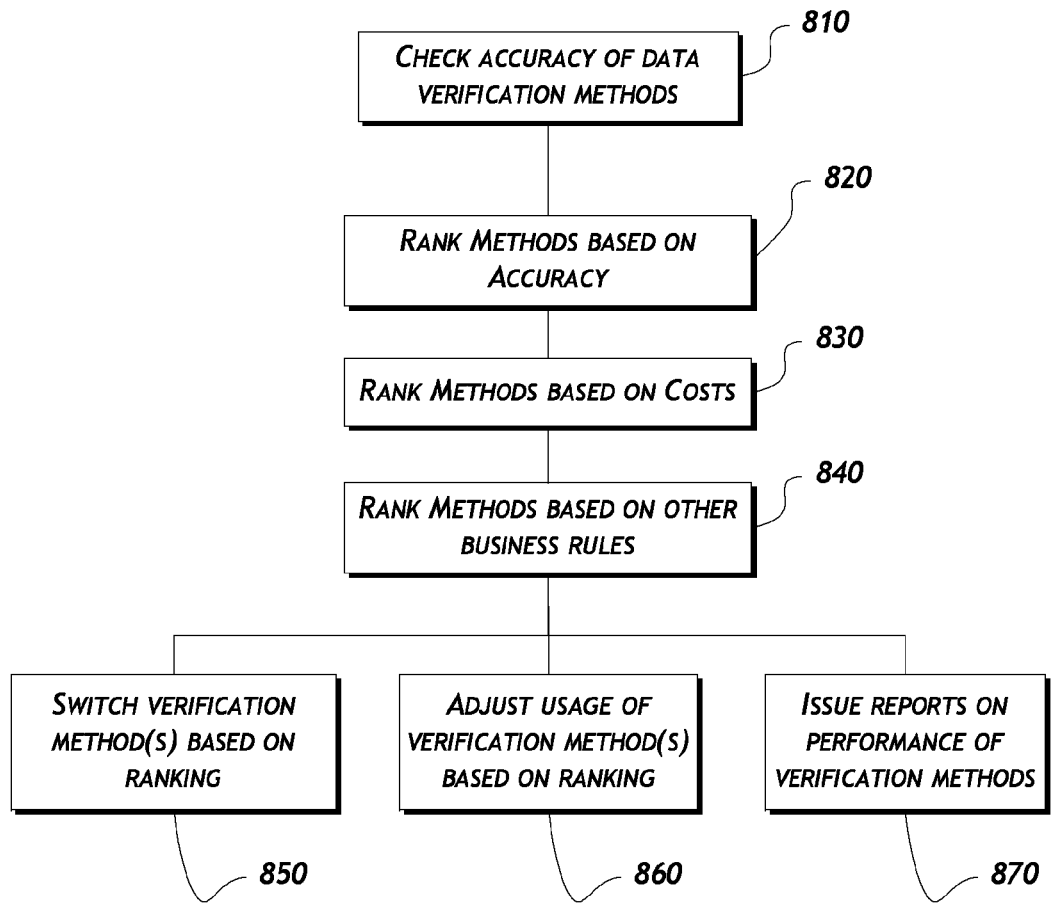
FIG. 8 is a flow diagram showing an example method of ranking data verification methods according to one embodiment.

With reference to FIG. 8, the quality control module 312 may check the accuracy of data verification methods at block 810. In certain embodiments, the quality control involves taking a sample of data records previous verified by a data verification method and compare them to the results of another data verification method. At block 820, the quality control module 312 is configured to dynamically rank, continuously or periodically, the foregoing data verification methods relative to their accuracy.

At block 830, the quality control module 312 is configured to dynamically compare and/or rank, continuously or periodically, the relative expense of using the foregoing verification methods. Optionally, at block 840, the quality control module 312 is configured to dynamically compare and/or rank, continuously or periodically, the foregoing verification methods based on other business rules.

At block 850, in certain embodiments, the quality control module 312 is configured to switch dynamically between the foregoing data verification methods. At block 860, in certain embodiments, the quality control module 312 is configured to increase the use of highly ranked data verification methods over lower ranked data verification methods based on accuracy, expense, or other ranking criteria (for example, regulatory compliance, timing, and so forth). In certain embodiments, at block 870, the data verification system provides reports, written or graphical or otherwise, for comparing the verification methods. The data verification system may provide reports that include without limitation, for example, dashboards, scorecards, or the like.

In certain embodiments, the data verification system is configured to signal to an operator or system administrator or project manager or the like when a certain data verification methodology falls below a certain accuracy level. In certain embodiments, the data verification system is configured to cause or start an investigation when the data verification system detects that a certain data verification methodology has fallen below a certain accuracy threshold.

Various Embodiments of System and Method Implementations

In certain embodiments, the systems and methods for verifying and updating data may be embodied in part or in whole in software that is running on a computing device. The functionality provided for in the components and modules of the computing device may comprise one or more components and/or modules. For example, the computing device may comprise multiple central processing units (CPUs) and a mass storage device, such as may be implemented in an array of servers.

In general, the word "module," "application", or "engine," as used herein, refers to logic embodied in hardware and/or firmware, and/or to a collection of software instructions, possibly having entry and exit points, written in a programming language, such as, for example, Java, C, and/or C++. These may be compiled and linked into an executable program, installed in a dynamic link library, or may be written in an interpreted programming language such as, for example, BASIC, Perl, or Python. It will be appreciated that modules, applications, and engines may be callable from others and/or from themselves, and/or may be invoked in response to detected events or interrupts. Instructions may be embedded in firmware, such as an EPROM.

It will be further appreciated that hardware may be comprised of connected logic units, such as gates and flip-flops, and/or may be comprised of programmable units, such as programmable gate arrays or processors. The modules, applications, and engines described herein are in certain applications preferably implemented as software modules, but may be represented in hardware or firmware in other implementations. Generally, the modules, applications, and engines described herein refer to logical modules that may be combined with other modules and/or divided into sub-modules despite their physical organization or storage.

In some embodiments, the computing device(s) communicates with one or more databases that store information on individuals, households, and businesses, including credit data and/or non-credit data. This database or databases may be implemented using a relational database, such as SQLite, Sybase, Oracle, CodeBase, mySQL, and Microsoft® SQL Server as well as other types of databases such as, for example, a flat file database, an entity-relationship database, and object-oriented database, and/or a record-based database.

In certain embodiments, the computing device is IBM, Macintosh, and/or Linux/Unix compatible. In another embodiment, the computing device comprises a server, a laptop computer, a cell phone, a Blackberry, a personal digital assistant, a kiosk, or an audio player, for example. In certain embodiments, the computing device includes one or more CPUs, which may each include microprocessors. The computing device may further include one or more memory devices, such as random access memory (RAM) for temporary storage of information and read only memory (ROM) for permanent storage of information, and one or more mass storage devices, such as hard drives, diskettes, or optical media storage devices. In certain embodiments, the modules of the computing are in communication via a standards based bus system, such as bus systems using Peripheral Component Interconnect (PCI), Microchannel, SCSI, Industrial Standard Architecture (ISA) and Extended ISA (EISA) architectures, for example. In certain embodiments, components of the computing device communicate via a network, such as a local area network that may be secured.

The computing is generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing device may be controlled by a proprietary operating system. Conventional operating systems control and schedule computer processes for execution, perform memory management, provide file system, networking, and I/O services, and provide a user interface, such as a graphical user interface (GUI), among other things.

The computing device may include one or more commonly available input/output (I/O) devices and interfaces, such as a keyboard, mouse, touchpad, microphone, and printer. Thus, in certain embodiments the computing device may be controlled using the keyboard and mouse input devices, while in another embodiment the user may provide voice commands to the computing device via a microphone. In certain embodiments, the I/O devices and interfaces include one or more display device, such as a monitor, that allows the visual presentation of data to a user. More particularly, a display device provides for the presentation of GUIs, application software data, and multimedia presentations, for example. The computing device may also include one or more multimedia devices, such as speakers, video cards, graphics accelerators, and microphones, for example.

In certain embodiments, the I/O devices and interfaces provide a communication interface to various external devices. For example, the computing device may be configured to communicate with one or more networks, such as any combination of one or more LANs, WANs, or the Internet, for example, via a wired, wireless, or combination of wired and wireless, communication links. The network communicates with various computing devices and/or other electronic devices via wired or wireless communication links.

Although the foregoing disclosure has been described in terms of certain embodiments, other embodiments will be apparent to those of ordinary skill in the art from the disclosure herein. Moreover, the described embodiments have been presented by way of example only, and are not intended to limit the scope of the disclosure. Indeed, the novel methods and systems described herein may be embodied in a variety of other forms without departing from the spirit thereof. Accordingly, other combinations, omissions, substitutions and modifications will be apparent to the skilled artisan in view of the disclosure herein. For purposes of discussing the invention, certain aspects, advantages and novel features of the invention have been described herein. Of course, it is to be understood that not necessarily all such aspects, advantages or features will be embodied in any particular embodiment of the disclosure.

What is claimed is:

1. An automated system for verifying data comprising:
a computerized system comprising one or more computing devices, said computing devices configured to implement at least:
a data selection module configured to select at least a portion of data to be verified, wherein the data is associated with an individual; and
an artificial intelligence module configured to select one or more data verification methods, based on prior results of use of one or more data verification methods, from web-crawling and one or more of tele-verification, agent web verification, direct-mail verification, email verification, and in-person verification to apply to the selected at least a portion of the data, wherein the at least a portion of the data is verified, updated, or appended as a result of application of the one or more selected data verification methods to the selected at least a portion of the data.

2. The system of claim 1 further comprising cost data stored on the system indicating costs of the data verification methods; and
the artificial intelligence module is further configured to select two data verification methods using the cost data for the two data verification methods, wherein the selected data verification method with the lower cost is applied to the selected portion of the data, and the selected data verification method with the higher cost is applied to a subset of the selected portion of the data.

3. The system of claim 2 wherein the results from the application of the higher-cost data verification method is used to gauge the effectiveness of the lower-cost data verification method.

4. The system of claim 1 wherein the artificial intelligence module is configured to monitor the effectiveness of the one or more selected data verification methods and to adapt the use of the one or more selected data verification methods based on the monitored effectiveness.

5. The system of claim 1 wherein the artificial intelligence module is configured to select the one or more data verification methods based on cost data related to the data verification methods.

6. The system of claim 1 wherein the data to be verified is consumer data related to individuals.

7. The system of claim 1 wherein the data to be verified is consumer data related to households.

8. The system of claim 1 wherein the data to be verified is business data related to businesses.

9. An automated system for verifying data comprising:
a computerized system comprising one or more computing devices, said computing devices configured to implement at least:
   a data segmentation module configured to segment data to be verified into a plurality of data portions, wherein each data portion comprises a characteristic; and
   an artificial intelligence module configured to select a data verification method to apply to each of the plurality of data portions based on the characteristic of the data portion, wherein data is verified, updated, or appended as a result of application of the selected data verification method,
wherein the characteristic is a value associated with the data portion,
wherein the artificial intelligence module selects a first data verification method for a first data portion with a high value and a second data verification method for a second data portion with a low value, and
wherein the first data verification method comprises a tele-verification method.

10. An automated system for verifying data comprising:
a computerized system comprising one or more computing devices, said computing devices configured to implement at least:
   a data segmentation module configured to segment data to be verified into a plurality of data portions, wherein each data portion comprises a characteristic; and
   an artificial intelligence module configured to select a data verification method to apply to each of the plurality of data portions based on the characteristic of the data portion, wherein data is verified, updated, or appended as a result of application of the selected data verification method,
wherein the characteristic is a value associated with the data portion,
wherein the artificial intelligence module selects a first data verification method for a first data portion with a high value and a second data verification method for a second data portion with a low value, and
wherein the second data verification method comprises a web-crawling method.

11. An automated system for verifying data comprising:
a computerized system comprising one or more computing devices, said computing devices configured to implement at least:
   a data segmentation module configured to segment data to be verified into a plurality of data portions, wherein each data portion comprises a characteristic; and
   an artificial intelligence module configured to select a data verification method to apply to each of the plurality of data portions based on the characteristic of the data portion, wherein data is verified, updated, or appended as a result of application of the selected data verification method,
wherein the artificial intelligence module selects a data verification method for a first data portion with a first characteristic indicating reliable data is readily available on-line and a data verification method for a second data portion with a second characteristic indicating reliable data is not readily available on-line.

12. An automated system for verifying data comprising:
a computerized system comprising one or more computing devices, said computing devices configured to implement at least:
   a data segmentation module configured to segment data to be verified into a plurality of data portions, wherein each data portion comprises a characteristic; and
   an artificial intelligence module configured to select a data verification method to apply to each of the plurality of data portions based on the characteristic of the data portion, wherein data is verified, updated, or appended as a result of application of the selected data verification method,
wherein the artificial intelligence module selects a data verification method for a data portion with a characteristic indicating reliable data is readily available on-line and the computerized system has access to additional corroboration sources.

13. An automated system for verifying data comprising:
a computerized system comprising one or more computing devices, said computing devices configured to implement at least:
   a data segmentation module configured to segment data to be verified into a plurality of data portions, wherein each data portion comprises a characteristic; and
   an artificial intelligence module configured to select a data verification method to apply to each of the plurality of data portions based on the characteristic of the data portion, wherein data is verified, updated, or appended as a result of application of the selected data verification method,
wherein the data segmentation module segments data based on a credit score of entities associated with the data.

14. An automated system for verifying data comprising:
a computerized system comprising one or more computing devices, said computing devices configured to implement at least:
   a data segmentation module configured to segment data to be verified into a plurality of data portions, wherein each data portion comprises a characteristic; and
   an artificial intelligence module configured to select a data verification method to apply to each of the plurality of data portions based on the characteristic of the data portion, wherein data is verified, updated, or appended as a result of application of the selected data verification method,
wherein the data segmentation module segments data based on an industry of entities associated with the data.

15. An automated method of data verification, comprising:
selecting, by a processor of a computing device, a portion of data to be verified, wherein the data is associated with an individual; and
selecting, by the processor, one or more data verification methods from web-crawling and one or more of tele-verification, agent web verification, direct-mail verification, email verification, and in-person verification to apply to the selected portion of the data, based on prior results of use of the data verification methods, wherein the data is verified, updated, or appended as a result of application of the one or more data verification methods to the selected portion of the data.

16. The method of claim 15 further comprising:
storing, by the processor, cost data indicating costs of the data verification methods; and
the selecting one or more data verification methods further comprises selecting two data verification methods using the cost data for the two data verification methods, wherein the selected data verification method with the lower cost is applied to the selected portion of the data, and the selected data verification method with the higher cost is applied to a subset of the selected portion of the data.

17. The method of claim 15 wherein the results from the application of the higher-cost data verification method is used to gauge the effectiveness of the lower-cost data verification method.

18. The method of claim 15 wherein the selecting of the one or more data verification methods comprises monitoring the effectiveness of the one or more selected data verification methods and adapting the use of the one or more selected data verification methods based on the monitored effectiveness.

19. The method of claim 15 wherein the selecting of the one or more data verification methods comprises selecting the one or more selected data verification methods based on cost data related to the one or more data verification methods.

20. An automated method for verifying data comprising:
segmenting, by a processor of a computing device, data to be verified into a plurality of data portions, wherein each data portion comprises a characteristic; and
selecting, by the processor, a data verification method to apply to each of the plurality of data portions based on the characteristic of the data portion, wherein data is verified, updated, or appended as a result of application of selected data verification method,
wherein the selecting comprises selecting a data verification method for a first data portion with a first characteristic indicating reliable data is readily available on-line and a data verification method for a second data portion with a second characteristic indicating data reliable data is not readily available on-line.

21. An automated method for verifying data comprising:
segmenting, by a processor of a computing device, data to be verified into a plurality of data portions, wherein each data portion comprises a characteristic; and
selecting, by the processor, a data verification method to apply to each of the plurality of data portions based on the characteristic of the data portion, wherein data is verified, updated, or appended as a result of application of the selected data verification method,
wherein the selecting comprises selecting a data verification method for a data portion with a characteristic indicating reliable data is readily available on-line and the computing device has access to additional corroboration sources.

22. An automated method for verifying data comprising:
segmenting, by a processor of a computing device, data to be verified into a plurality of data portions, wherein each data portion comprises a characteristic; and
selecting, by the processor, a data verification method to apply to each of the plurality of data portions based on the characteristic of the data portion, wherein data is verified, updated, or appended as a result of application of selected data verification method,
wherein the segmenting comprises segmenting data based on the credit score of the entities associated with the data.

23. An automated method for verifying data comprising:
segmenting, by a processor of a computing device, data to be verified into a plurality of data portions, wherein each data portion comprises a characteristic; and
selecting, by the processor, a data verification method to apply to each of the plurality of data portions based on the characteristic of the data portion, wherein data is verified, updated, or appended as a result of application of the selected data verification method,
wherein the segmenting comprises segmenting data based on the industry of the entities associated with the data.

24. A computer program product comprising a non-transitory computer usable medium having control logic stored therein for causing a computer to verify data, the control logic comprising:
a first computer readable program code means for causing the computer to select a portion of data to be verified, wherein the data is associated with an individual; and
a second computer readable program code means for causing the computer to select one or more data verification methods, based on prior results of the use of the one or more data verification methods, from web-crawling and one or more of tele-verification, agent web verification, direct-mail verification, email verification, and in-person verification to apply to the selected portion of the data, wherein the data is verified, updated or appended as a result of application of the one or more selected data verification methods to the selected portion of the data.

25. The computer program product of claim 24, further comprising:
a third computer readable program code means for causing the computer to store cost data on the computer, the cost data indicating costs of data verification methods;
wherein the second computer readable program code means comprises computer readable program code means for causing the computer to select two data verification methods using the cost data for the two data verification methods, and
wherein the selected data verification method with the lower cost is applied to the selected portion of the data, and the selected data verification method with the higher cost is applied to a subset of the selected portion of the data.

26. The computer program product of claim 24 wherein the second computer readable program code means comprises computer readable program code means for causing the computer to use the results from application of the higher-cost data verification method to gauge the effectiveness of the lower-cost data verification method.

* * * * *